United States Patent
Yang et al.

(10) Patent No.: US 8,253,757 B2
(45) Date of Patent: *Aug. 28, 2012

(54) METHOD, SYSTEM AND SOFTWARE PRODUCT FOR COLOR IMAGE ENCODING

(75) Inventors: En-Hui Yang, Waterloo (CA); Jianfen Zeng, Guangzhou (CN)

(73) Assignee: SlipStream Data Inc., Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/194,376

(22) Filed: Jul. 29, 2011

(65) Prior Publication Data

US 2011/0279474 A1 Nov. 17, 2011

Related U.S. Application Data

(60) Continuation of application No. 12/404,417, filed on Mar. 16, 2009, now Pat. No. 8,022,963, which is a division of application No. 10/831,656, filed on Apr. 23, 2004, now Pat. No. 7,525,552.

(60) Provisional application No. 60/564,033, filed on Apr. 21, 2004.

(51) Int. Cl.
*G09G 5/02* (2006.01)
*G06K 9/36* (2006.01)

(52) U.S. Cl. .......................... 345/600; 345/593; 382/232

(58) Field of Classification Search ........................ None
See application file for complete search history.

(56) References Cited

U.S. PATENT DOCUMENTS

| | | | |
|---|---|---|---|
| 5,047,842 A | 9/1991 | Bouman, Jr. et al. |
| 5,432,893 A | 7/1995 | Blasubramanian et al. |
| 5,544,284 A | 8/1996 | Allebach et al. |
| 5,990,864 A | 11/1999 | DeAguiar et al. |
| 6,289,131 B1 | 9/2001 | Ishikawa |
| 6,337,929 B1 | 1/2002 | Kajiwara et al. |
| 6,360,019 B1 | 3/2002 | Chaddha |
| 6,625,321 B1 | 9/2003 | Li et al. |
| 7,525,552 B2 | 4/2009 | Yang et al. |

FOREIGN PATENT DOCUMENTS

| | | |
|---|---|---|
| JP | 10-173538 | 6/1998 |
| JP | 11-177985 | 7/1999 |
| KR | 10-0868716 | 11/2008 |
| WO | WO 02/069270 | 9/2002 |

OTHER PUBLICATIONS

Ashdown, Ian; "Octree Color Quanitzation"; C/C++ Users Journal; Mar. 1995; pp. 31-43.
Barrilleaux, J. et al.; "Efficient Vector Quantization for Color Image Encoding"; Acoustics, Speech, and Signal Processing; IEEE International Conference on ICASSP; vol. 12; Apr. 1987; pp. 740-743.
Chen, X. et al.; "A New Compression Scheme for Color-Quantized Images"; IEEE Transactions on Circuits and Ssytems for Video Technology; vol. 12, No. 10; Oct. 2002; pp. 904-908.

(Continued)

*Primary Examiner* — Ryan R Yang
(74) *Attorney, Agent, or Firm* — Fish & Richardson P.C.

(57) ABSTRACT

The present invention relates to the compression of color image data. A combination of hard decision pixel mapping and soft decision pixel mapping is used to jointly address both quantization distortion and compression rate while maintaining low computational complexity and compatibility with standard decoders, such as, for example, the GIF/PNG decoder.

21 Claims, 5 Drawing Sheets

OTHER PUBLICATIONS

Chou, P.A. et al.; "Entropy-Constrained Vector Quantization"; IEEE Transactions on Accoustics, Speech and Signal Processing; vol. 37, No. 1; Jan. 1989; pp. 31-42.

Gervautz, M. et al.; "A Simple Method for Color Quantization: Octree Quantization"; Grpahics Gems; Academic Press; 1990; pp. 287-293.

Heckbert, Paul; "Color Image Quantization for Frame Buffer Display"; Computer Graphics; vol. 16, No. 3; Jul. 1982; pp. 297-307.

Huffman, David; "A Method for the Construction of Minimum-Redundancy Codes"; Proceedings of the I.R.E.; vol. 40, No. 9; Sep. 1952; pp. 1098-1101.

Kieffer, J. et al.; "Grammar-Based Codes: A New Class of Universal Lossless Source Codes"; IEEE Transactions on Information Theory; vol. 46, No. 3; May 2000; pp. 737-754.

Lloyd, Stuart P.; "Least Squares Quantization in PCM"; IEEE Transactions on Information Theory; vol. 28, No. 2; Mar. 1982; pp. 129-137.

Memon, N. et al.; "On Ordering Color Maps for Lossless Predictive Coding"; IEEE Transactions on Image Processing; vol. 5, No. 11; Nov. 1996; pp. 1522-1527.

Miano, J.; "Compress Image File Formats: JPEG, PNG, GIF, XBM, BMP"; ACM Press; 2000; pp. 171-188.

Orchard, M. et al.; "Color Quantization of Images"; IEEE Transactions on Signal Processing; vol. 39, No. 2; Dec. 1991; pp. 2677-2690.

Puzicha, J. et al.; "On Spatial Quantization of Color Images"; IEEE Transactions on Image Processing; vol. 9, No. 4; Apr. 2000; pp. 666-682.

Scheunders, P. et al.; "Joint Quantization and Error Diffusion of Color Images Using Competitve Learning"; International Conference on Image Processing; vol. 1; Oct. 1997; pp. 811-814.

Velho, L. et al.; "Color Image Quantization by Pairwise Clustering"; Proceedings of 10th Brazilian Symposium on Computer Graphic Image Processing; 1997; pp. 203-210.

Waldemar, P. et al. "Subband Coding of Color Images with Limited Palette Size"; IEEE International Conference on Accoustics, Speec, and Signal Processing; Apr. 1994; pp. V353-356.

Wan, S.J. et al.; "Variance-Based Color Image Quantization for Frame Buffer Display"; Color Research and Application; vol. 15; Feb. 1990; pp. 52-58.

Wan, X. et al.; "Image Retrieval with an Octree-Based Color Indexing Scheme"; IEEE International Symposium on Circuits and Systems; Jun. 1997; pp. 1357-1360.

Wan, X. et al.; "A New Approach to Image Retrieval with Hierarchical Color Clustering"; IEEE Transactions on Circuits and Systems for Video Technology; vol. 8, No. 5; Sep. 1998; pp. 628-643.

Witten, I. et al.; "Arithmetic Coding for Data Compression"; Communications of the ACM; vol. 30, No. 6; Jun. 1987; pp. 520-540.

Wong, Ping Wah; "Entropy-Constrained Halftoning Using Multipath Tree Coding"; IEEE Transactions on Image Processing; vol. 6, No. 11; Nov. 1997; pp. 1567-1579.

Wu, Xiaolin; "YIQ Vector Quantization in a New Color Palette Architecture"; IEEE Transactions on Image Processing; vol. 5, No. 2; 1996; pp. 321-329.

Yang, E. et al.; "Efficient Universal Lossless Data Compression Algorithms Based on a Greedy Sequential Grammar Transform—Part One: Without Context Models"; IEEE Transactions on Information Theory; vol. 46, No. 3; May 2000; pp. 755-777.

Yang, E. et al.; "Efficient Universal Lossless Data Compression Algorithms Based on a Greedy Sequential Grammar Transform—Part Two: With Context Models"; IEEE Transactions on Information Theory; vol. 49, No. 11; Nov. 2003; pp. 2874-2894.

Yang, E. et al.; "Variable-Rate Trellis Source Encoding"; 1998 IEEE International Symposium; Cambridge, Massachusetts; Aug. 16-21, 1998; p. 369.

Yang, E. et al.; "Variable-Rate Trellis Source Encoding"; IEEE Transactions on Information Theory; vol. 45, No. 2; Mar. 1999; pp. 586-608.

Yang, E. et al.; "Fixed-Slope Universal Lossy Data Compression"; IEEE Transactions on Information Theory; vol. 43, No. 5; Sep. 1997; pp. 1465-1476.

Zaccarin, A. et al.; "A Novel Approach for Coding Color Quantized Images"; IEEE Transactions on Image Processing; vol. 2, No. 4; Oct. 1993; pp. 442-453.

Ziv, J. et al.; "Compression of Individual Sequences Variable-Rate Coding"; IEEE Transactions on Information Theory; vol. 24, No. 5; Sep. 1978; pp. 530-536.

Ziv, J. et al.; "A Universal Alogrithm for Sequential Data Compression"; IEEE Transactions on Information Theory; vol. 23, No. 3; May 1997; pp. 337-343.

International Search Report and Written Opinion of the International Searching Authority issued in International Application No. PCT/CA2005/000573 on Jun. 22, 2005.

International Preliminary Report on Patentability issued in International Appl. No. PCT/CA2005/000573 on Oct. 25, 2006; 5 pages.

Extended European Search Report issued in European Application No. 07118519.3 on Mar. 13, 2008; 7 pages.

Communication Pursuant to Art. 94(3) issued in European Application No. 07118519.3 on Nov. 24, 2008; 5 pages.

Supplementary Partial Search Report issued in European Application No. 05734230.5 on Aug. 1, 2007; 4 pages.

Communication Pursuant to Art. 94(3) issued in European Application No. 05734230.5 on Jun. 18, 2008; 8 pages.

Communication under Rule 71(3) issued in European Application No. 05734230.5 on Apr. 2, 2009; 6 pages.

Examiner's Report No. 1 issued in Australian Application No. 2005236504 on May 12, 2008; 2 pages.

Examiner's Report No. 2 issued in Australian Application No. 2005236504 on May 28, 2009; 2 pages.

Examiner's Report No. 3 issued in Australian Application No. 2005236504 on Dec. 4, 2009; 2 pages.

Examiner's Report No. 1 issued in Australian Application No. 2010200101 on Apr. 5, 2011; 2 pages.

Office Action issued in Canadian Application No. 2,563,122 on Apr. 14, 2010; 4 pages.

Office Action issued in Chinese Application No. 200580012655.X on Apr. 13, 2010; 12 pages.

Office Action issued in Japanese Application No. 2007-508692 on Apr. 7, 2010; 2 pages.

First Examination Report issued in Indian Application No. 6164/DELNP/2006 on Mar. 23, 2011; 2 pages.

Office Action issued in U.S. Appl. No. 10/831,656, on Nov. 1, 2007; 9 pages.

Office Action issued in U.S. Appl. No. 10/831,656, on Jun. 6, 2008; 4 pages.

Office Action issued in U.S. Appl. No. 10/831,656, on Sep. 26, 2008; 7 pages.

Notice of Allowance issued in U.S. Appl. No. 10/831,656, on Dec. 16, 2008; 7 pages.

Notice of Allowance issued in U.S. Appl. No. 12/404,417, on May 27, 2010; 7 pages.

Notice of Allowance issued in U.S. Appl. No. 12/404,417, on Nov. 22, 2010; 7 pages.

Notice of Allowance issued in U.S. Appl. No. 12/404,417, on Apr. 14, 2011; 8 pages.

Office Action issued in U.S. Appl. No. 13/072,212, on May 18, 2011; 12 pages.

Notice of Allowance issued in U.S. Appl. No. 13/072,212, on Sep. 28, 2011; 9 pages.

US 8,253,757 B2

METHOD, SYSTEM AND SOFTWARE PRODUCT FOR COLOR IMAGE ENCODING

CROSS-REFERENCE TO RELATED APPLICATIONS

This application is a continuation of U.S. patent application Ser. No. 12/404,417, filed Mar. 16, 2009, which is a divisional of U.S. patent application Ser. No. 10/831,656, filed on Apr. 23, 2004, which claims the benefit of U.S. Provisional Application No. 60/564,033, filed on Apr. 21, 2004. U.S. patent application Ser. No. 10/831,656 issued to U.S. Pat. No. 7,525,552. The entire contents of U.S. patent application Ser. No. 12/404,417, U.S. patent application Ser. No. 10/831,656, and U.S. Patent Application No. 60/564,033 are herein incorporated by reference.

FIELD OF THE INVENTION

The present invention relates to a method, system and software product for color image encoding.

BACKGROUND OF THE INVENTION

In recent years, the volume of color image data on the Internet has been explosively increasing. In particular, due to the increasing popularity of web sites, digital cameras, and online games, color image data have become a significant portion of the Internet traffic. On the other hand, access to color images through wireless channels or via low power, small devices is still time-consuming and inconvenient, which is mainly due to the limitations of image display device, storage, and transmission bandwidth has become a bottleneck for many multimedia applications—see, for example, J. Barrilleaux, R. Hinkle, and S. Wells, "Efficient vector quantization for color image encoding," *Acoustics, Speech, and Signal Processing, IEEE International Conference on ICASSP '87*, vol. 12, pp. 740-743, April 1987 (hereinafter "reference [1]"), M. T. Orchard and C. A. Bouman, "Color quantization of images," *Signal Processing, IEEE Transactions on*, vol. 39, no. 12, pp. 2677-2690, December 1991 (hereinafter "reference [2]"), I. Ashdown, "Octree color quantization," *C/C++ Users Journal*, vol. 13, no. 3, pp. 31-43, 1994 (hereinafter "reference [3]"), X. Wu, "Yiq vector quantization in a new color palette architecture," *IEEE Trans. on Image Processing*, vol. 5, no. 2, pp. 321-329, 1996 (hereinafter "reference [4]"), L. Velho, J. Gomes, and M. V. R. Sobreiro, "Color image quantization by pairwise clustering," *Proc. Tenth Brazilian Symp. Comput. Graph. Image Process*, L. H. de Figueiredo and M. L. Netto, Eds. Campos do Jordao, Spain, pp. 203-210, 1997 (hereinafter "reference [5]") and S. Wan, P. Prusinkiewicz, and S. Wong, "Variance-based color image quantization for frame buffer display," *Res. Appl.*, vol. 15, pp. 52-58, 1990 (hereinafter "reference [6]").

One way to alleviate the above limitations is to apply efficient color image encoding schemes which compress, optimize, or re-encode color images. A typical color image encoding scheme consists of a color palette, pixel mapping, and lossless code. The color palette acts as a vector quantization codebook, and is used to represent all colors in the original color image. The pixel mapping then maps each pixel in the image into an index corresponding to a color in the color palette. The pixel mapping could be either a hard decision pixel mapping for which the quantization of a RGB color vector into a color of the color palette is fixed and independent of the pixel location of the RGB color vector in the image once the color palette is given, or a soft decision pixel mapping for which a RGB color vector may be quantized into different colors of the color palette at different pixel locations. The index sequence resulting from the pixel mapping is finally encoded by a lossless code.

Previously, color palette design, pixel mapping, and coding were investigated separately. In the design of color palette and pixel mapping, the coding part is often ignored and the main objective is to reduce the quantization distortion, improve visual quality of quantized images, and decrease computational complexity. Several tree-structured splitting and merging color image quantization methods are proposed in the literature—see, for example, references [1] to [6]—to achieve, more or less, this objective. On the other hand, when coding is concerned, the color palette and pixel mapping are often assumed to be given, and the objective is to design efficient codes for the index sequence so as to reduce the compression rate. For instance, an algorithm for lossy compression in the LUV color space of color-quantized images was given in A. Zaccarin and B. Liu, "A novel approach for coding color quantized image," *Image Processing, IEEE Transactions on*, vol. 2, no. 4, pp. 442-453, October 1993 (hereinafter "reference [7]"). Two heuristic solutions were proposed in N. D. Memon and A. Venkateswaran, "On ordering color maps for lossless predictive coding," *IEEE Transactions on Image Processing*, vol. 5, no. 11, pp. 1522-1527, 1996 (hereinafter "reference [8]"), to reorder color maps prior to encoding the image by lossless predictive coding techniques. Based on a binary-tree structure and context-based entropy coding, a compression algorithm was proposed in X. Chen, S. Kwong, and J. fu Feng, "A new compression scheme for color-quantized images," *Circuits and Systems for Video Technology, IEEE Transactions on*, vol. 12, no. 10, pp. 904-908, October 2002 (hereinafter "reference [9]") to provide progressive coding of color-quantized images. In these algorithms, the compression efficiency is achieved at the expense of compressed bit streams incompatible with standard decoders such as the GIF/PNG decoder.

SUMMARY OF THE INVENTION

In accordance with a first aspect of the present invention, there is provided a method for creating, from a digitized color image with N distinct colors using a data processing system, a tree structured partitioning of all pixels in the digitized color image into M disjoint clusters, wherein M is less than or equal to N, each color in the N distinct colors is digitally represented by a plurality of P-bit bytes in a color palette, and the P-bits in each P-bit byte are ordered from most significant to least significant. The method comprises (a) providing a root node comprising all of the N distinct colors; (b) providing a first level of sibling nodes linked to the root node, wherein each color in the N distinct colors is allocated by the data processing system to an associated node in the first level of sibling nodes based on a value of a first bit in each P-bit byte in the plurality of P-bit bytes; (c) for each node in a $k^{th}$ level of nodes comprising more than one color, providing a plurality of sibling nodes at a $(k+1)^{th}$ level, wherein each color in that node is allocated by the data processing system to an associated sibling node in the plurality of sibling nodes at the $(k+1)^{th}$ level based on a value of a $(k+1)^{th}$ bit in each P-bit byte in the plurality of P-bit bytes for that color, such that for each color in the N distinct colors there is a distinct leaf node comprising that color alone; and (d) selecting and merging leaf nodes until there are only M leaf nodes left.

In accordance with a second aspect of the present invention, there is provided a data processing system for creating, from a digitized color image with N distinct colors, a tree structured partitioning of all pixels in the digitized color image into M disjoint clusters, wherein M is less than or equal to N, each color in the N distinct colors is digitally represented by a plurality of P-bit bytes in a color palette, and the P-bits in each P-bit byte are ordered from most significant to least significant. The data processing system comprises: (a) node-creation means for (i) providing a root node comprising all of the N distinct colors; (ii) providing a first level of sibling nodes linked to the root node, wherein each color in the N distinct colors is allocated to an associated node in the first level of sibling nodes based on a value of a first bit in each P-bit byte in the plurality of P-bit bytes; and (iii) for each node in a $k^{th}$ level of nodes comprising more than one color, providing a plurality of sibling nodes at a $(k+1)^{th}$ level, wherein each color in that node is allocated to an associated sibling node in the plurality of sibling nodes at the $(k+1)^{th}$ level based on a value of a $(k+1)^{th}$ bit in each P-bit byte in the plurality of P-bit bytes for that color, such that for each color in the N distinct colors there is a distinct leaf node comprising that color alone; and (b) node merging means for selecting and merging leaf nodes until there are only M leaf nodes left.

In accordance with a third aspect of the present invention, there is provided a computer program product for use on a computer system to create, from a digitized color image with N distinct colors, a tree structured partitioning of all pixels in the digitized color image into M disjoint clusters, wherein M is less than or equal to N, each color in the N distinct colors is digitally represented by a plurality of P-bit bytes in a color palette, and the P-bits in each P-bit byte are ordered from most significant to least significant. The computer program product comprises a recording medium; means recorded on the medium for instructing the computer system to perform the steps of: (a) providing a root node comprising all of the N distinct colors; (b) providing a first level of sibling nodes linked to the root node, wherein each color in the N distinct colors is allocated to an associated node in the first level of sibling nodes based on a value of a first bit in each P-bit byte in the plurality of P-bit bytes; (c) for each node in a $k^{th}$ level of nodes comprising more than one color, providing a plurality of sibling nodes at a $(k+1)^{th}$ level, wherein each color in that node is allocated to an associated sibling node in the plurality of sibling nodes at the $(k+1)^{th}$ level based on a value of a $(k+1)^{th}$ bit in each P-bit byte in the plurality of P-bit bytes for that color, such that for each color in the N distinct colors there is a distinct leaf node comprising that color alone; and (d) selecting and merging leaf nodes until there are only M leaf nodes left.

In accordance with a fourth aspect of the present invention, there is provided a method for deriving a new index sequence representing a pixel mapping and a new output function representing a color palette for a new digitized color image derived from an original digitized color image both defined on n pixels, wherein the original digitized color image is provided by N distinct colors being allocated to the n pixels, the new digitized color image is provided by M distinct colors being allocated to the n pixels, the new index sequence has n index members for representing the n pixels and the new output function is for mapping the n index members to the M colors. The method comprises (a) providing a first new index sequence by partitioning all pixels in the original digitized color image into M disjoint clusters based on a color of each pixel in the original digitized color image without regard to the location of the pixel in the original digitized color image, wherein M is less than or equal to N; (b) providing a first new output function for providing a one-to-one mapping of the M distinct colors onto the pixels in the M disjoint clusters; (c) applying a soft decision optimization process to the first new index sequence and the first new output function to provide the new index sequence and the new output function respectively based on, for each member of the first new index sequence, how a color value assigned to that member by the first new output function correlates with the color value assigned to at least one other member of the first new index sequence by the first new output function.

In accordance with a fifth aspect of the present invention, there is provided a data processing system for deriving a new index sequence representing a pixel mapping and a new output function representing a color palette for a new digitized color image derived from an original digitized color image both defined on n pixels, wherein the original digitized color image is provided by N distinct colors being allocated to the n pixels, the new digitized color image is provided by M distinct colors being allocated to the n pixels, the new index sequence has n index members for representing the n pixels and the new output function is for mapping the n index members to the M colors. The data processing system comprises (a) a hard decision module for (i) providing a first new index sequence by partitioning all pixels in the original digitized color image into M disjoint clusters based on a color of each pixel in the original digitized color image without regard to the location of the pixel in the original digitized color image, wherein M is less than or equal to N, and (ii) providing a first new output function for providing a one-to-one mapping of the M distinct colors onto the pixels in the M disjoint clusters; and, (b) a soft decision module for applying a soft decision optimization process to the first new index sequence and the first new output function to provide the new index sequence and the new output function respectively based on, for each member of the first new index sequence, how a color value assigned to that member by the first new output function correlates with the color value assigned to at least one other member of the first new index sequence by the first new output function.

In accordance with a sixth aspect of the present invention, there is provided a computer program product for use on a computer system to create a pixel mapping and a new output function representing a color palette for a new digitized color image derived from an original digitized color image both defined on n pixels, wherein the original digitized color image is provided by N distinct colors being allocated to the n pixels, the new digitized color image is provided by M distinct colors being allocated to the n pixels, the new index sequence has n index members for representing the n pixels and the new output function is for mapping the n index members to the M colors. The computer program product comprises a recording medium; and, means recorded on the medium for instructing the computer system to perform the steps of: (a) providing a first new index sequence by partitioning all pixels in the original digitized color image into M disjoint clusters based on a color of each pixel in the original digitized color image without regard to the location of the pixel in the original digitized color image, wherein M is less than or equal to N; (b) providing a first new output function for providing a one-to-one mapping of the M distinct colors onto the pixels in the M disjoint clusters; (c) applying a soft decision optimization process to the first new index sequence and the first new output function to provide the new index sequence and the new output function respectively based on, for each member of the first new index sequence, how a color value assigned to that member by the first new output function correlates with the color value assigned to at least one other member of the first new index sequence by the first new output function.

BRIEF DESCRIPTION OF THE DRAWINGS

A detailed description of preferred aspects of the invention is provided herein below with reference to the following drawings, in which.

DETAILED DESCRIPTION OF PREFERRED EMBODIMENTS OF THE INVENTION

Figure 1:
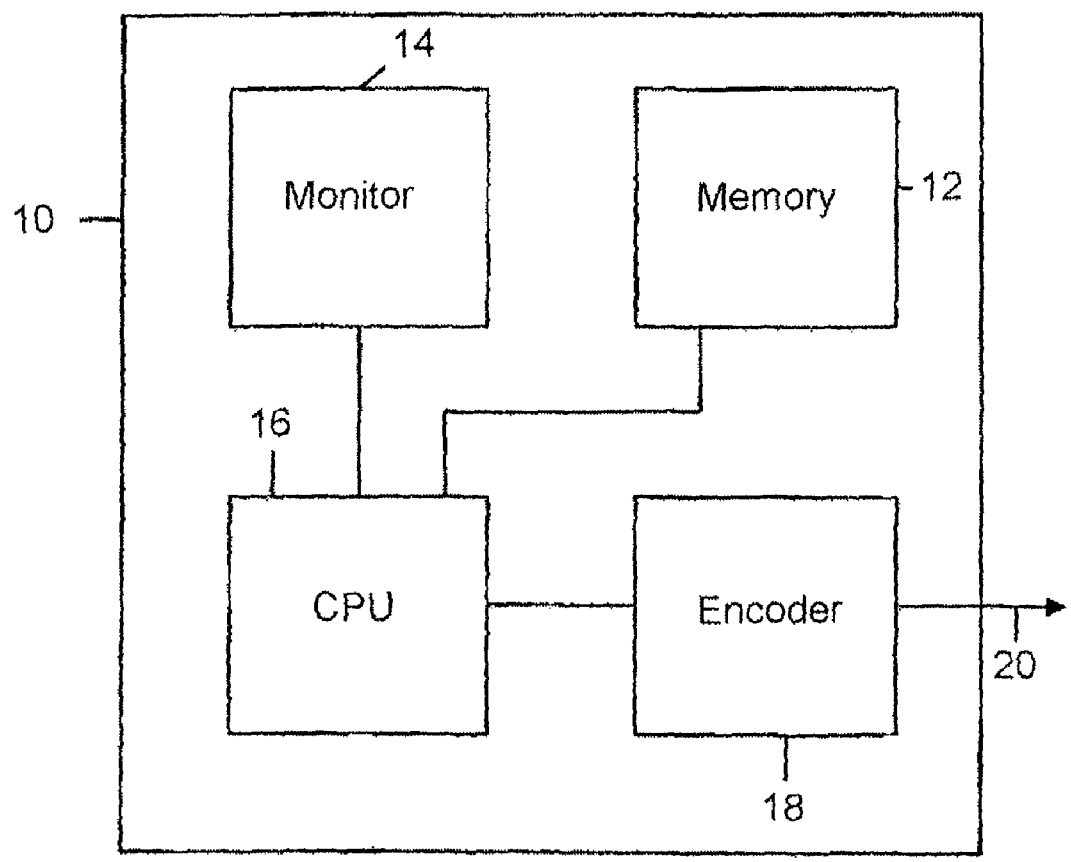
FIG. 1, in a block diagram, illustrates a computer system in accordance with a preferred aspect of the present invention.

Referring to FIG. 1, there is illustrated in a block diagram, a computer system 10 in accordance with an aspect of the invention. The computer system comprises a memory 12 for storing color image data, a monitor 14 for displaying digital color images, a CPU 16 for image processing and for providing compression of color data that jointly optimizes both quantization, distortion and compression weight while maintaining low computational complexity and compatibility with GIF/PNG decoders, and an encoder 20 such as a GIF encoder or PNG encoder for encoding the color image data prior to its transmission from the computer system 10 via transmission conduit 20.

The joint optimization problem of color image encoding can be defined as follows: Let $\Omega=\{(r,g,b)|0\leq r,g,b\leq 255\}$ be the RGB color space. Assume $O=\{o_0, o_1, \ldots, o_{N-1}\}$ is the color palette of an original color image which has N distinct colors. If the total number of pixels in the original image is n, we obtain an index sequence $I=(i_0, i_1, \ldots, i_{n-1})$ by scanning the color image from top to bottom and from left to right, where $i_k$ means that the color vector of the $k^{th}$ pixel is $o_{i_k}$. If we confine ourselves to using a new color palette C with M colors (M<N) to reproduce the original color image, the joint optimization encoder is aimed at finding a new color palette $C=\{c_0, c_1, \ldots, c_{M-1}\}$, a new index sequence $U=(u_0, u_1, \ldots, u_{n-1})$, and a lossless codeword length function l to reproduce the original image and to minimize the cost function:

$$n^{-1}l(U) + \lambda n^{-1}\sum_{k=0}^{n-1} d(o_{i_k}, c_{u_k})$$

where $\lambda$ is a Lagrangian multiplier, and d is the square error incurred by representing $o_{i_k}$ by $c_{u_k}$ $$d(o_i, c_k) = \|o_i - c_k\|^2 = (r_{o_i} - r_{c_k})^2 + (g_{o_i} - g_{c_k})^2 + (b_{o_i} - b_{c_k})^2 \quad (1.1)$$

Since there is a one-to-one mapping between a lossless codeword length function and a lossless code, selection of a lossless codeword length function is equivalent to that of a lossless code.

Clearly $$\sum_{k=0}^{n-1} d(o_{i_k}, c_{u_k}) = \sum_{k=0}^{n-1} [(r_{o_{i_k}} - r_{c_{u_k}})^2 + (g_{o_{i_k}} - g_{c_{u_k}})^2 + (b_{o_{i_k}} - b_{c_{u_k}})^2] \quad (1.2)$$

is the total square error (TSE), which is closely related with the visual quality of the quantized color images. Note that the minimization of TSE or other similar distortion measures is the sole purpose of quantization-oriented methods considered in references [1] to [6]. Similarly, given the new color palette C and pixel mapping (hence the index sequence U), the minimization of bit rate $n^{-1}l(U)$ among all possible lossless codeword length functions l is the sole purpose of coding methods for color-quantized images considered in references [7] to [9]. The cost function given above brings forward the problem of joint optimization of the rate and distortion. The quantization distortion is determined by the color palette C and pixel mapping (i.e., the index sequence U); the compression rate is determined by both the pixel mapping and the lossless codeword length function l. Here, of course, the pixel mapping is a soft decision pixel mapping. Therefore, even if the lossless codeword length function l is fixed, one can still jointly optimize both the rate and distortion by changing both C and U.

There are many lossless codeword length functions, each corresponding to a different entropy code, such as Huffman codes D. A. Huffman, "A method for the construction of minimum-redundancy codes," *Proc. IRE*, vol. 40, no. 9, pp. 1098-1101, 1952 (hereinafter "reference [12]"), Lempel-ziv codes J. Ziv and A. Lempel, "A universal algorithm for sequential data compression," *IEEE Trans. On Information Theory*, vol. 23, pp. 337-343, 1977 (hereinafter "reference [11]"), J. Ziv and A. Lempel *IEEE Trans. Inform. Theory* (hereinafter "reference [10]"), arithmetic codes I. H. Witten, M. Neal, and J. G. Cleary, "Arithmetic coding for data compression," *Commun. ACM*, vol. 30, pp. 520-540, June 1987 (hereinafter "reference [13]"), grammar-based codes, E.-H. Yang and J. C. Kieffer, "Efficient universal lossless data compression algorithms based on a greedy sequential grammar transform—part one: Without context models," *IEEE Trans. On Information Theory*, vol. 46, no. 3, pp. 755-777, May 2000 (hereinafter "reference [14]"), J. C. Kieffer and E.-H. Yang, "Grammar based codes: A new class of universal lossless source codes," *IEEE Trans. on Information Theory*, vol. 46, no. 3, pp. 737-754, May 2000 (hereinafter "reference [15]"), E.-H. Yang and D.-K. He *IEEE Trans. on Information Theory*, vol. 49, pp. 2874-2894, 2003 (hereinafter "reference [16]"), and lossless codes designed specifically for color image encoding—see references [7] to [9]. Since we want to maintain compatibility with GIF/PNG decoder, we choose/to be the codeword length of LZ78 or its variant in the case of GIF decoder and of the LZ77 code or its variant in the case of PNG decoder, J. Miano, "Compressed image file formats: Jpeg, png, gif, xbm, bmp," ACM Press, 2000 (hereinafter "reference [17]"), which will be denoted in each case simply by $l_{LZ}(U)$. Therefore, the cost function to be minimized in our case is $$n^{-1}l_{LZ}(U) + \lambda n^{-1}\sum_{k=0}^{n-1} d(o_{i_k}, c_{u_k}).$$

The cost function given above is of form similar to the cost function defined in entropy-constrained vector quantization (ECVQ), P. A. Chou, T. Lookabaugh, and R. M. Gray, "Entropy-constrained vector quantization," *Acoustics, Speech, and Signal Processing* [see also *IEEE Transactions on Signal Processing*], *IEEE Transactions on*, vol. 37, no. 1, pp. 31-42, January 1989 (hereinafter "reference [18]"), and in particular to the cost function defined in variable-rate trellis source encoding (VRTSE), E.-H. Yang and Z. Zhang, "Variable rate trellis source encoding," *IEEE Trans. on Information Theory*, vol. 45, no. 2, pp. 586-608, March 1999 (hereinafter "reference [19]"). VRTSE can be viewed as a generalization of entropy-constrained scalar quantization and vector quantization [18] in the sense that it makes use of trellis structure and jointly optimizes the resulting rate, distortion, and selected encoding path. Its efficient performance, especially in low rate regions, makes VRTSE particularly applicable to color image encoding where a high compression ratio is often desired for saving storage space and transmission time.

Based on VRTSE, we have developed two methods in accordance with an aspect of the invention, variable-rate trellis color quantization (VRTCQ), and VRTCQ 2, to jointly optimize both the quantization distortion and compression rate while maintaining low computational complexity and compatibility with GIF/PNG decoder. Both VRTCQ 1 and VRTCQ 2 use a soft decision pixel mapping, and are iterative. In addition, in accordance with a further aspect of the invention, entropy-constrained hierarchical merging quantization (ECHMQ), which uses the octree data structure for RGB colors and locally minimizes an entropy-constrained cost for the quantized color image, is developed to provide an initial color image encoding scheme for VRTCQ 1 and VRTCQ 2. On its own, ECHMQ provides an efficient way to trade off the rate and distortion of the quantized color image.

Brief Review of Variable-Rate Trellis Source Encoding

Variable-rate trellis source encoding presented in [19] is an extension of fixed slope lossy coding, E. H. Yang, Z. Zhang, and T. Berger, "Fixed-slope universal lossy data compression," *IEEE Trans. on Information Theory*, vol. 43, no. 5, pp. 1465-1476, September 1997 (hereinafter "reference [20]"), to the case of trellis-structured decoders. For each real-valued source sequence $x^n=(x_0, x_1, \ldots, x_{n-1}) \in R^n$, it aims to find a sequence $u^n=(u_0, u_1, \ldots u_{n-1}) \in M_{set}^n$, $M_{set}=\{0, 1, \ldots, M-1\}$, to minimize the cost function $$J(x^n) = n^{-1}l(u^n) + \lambda n^{-1}\rho(x^n, \beta(u^n))$$

where $\lambda$ is a given Lagrangian multiplier, l is a lossless codeword length function, $\beta(u^n)=(z_0, z_1, \ldots, z_{n-1})$ is the reproduction sequence corresponding to $u^n$, and $\rho$ is the square error distortion defined by $$\rho(x^n, z^n) \triangleq \sum_{i=0}^{n-1} \rho(x_i, z_i) \triangleq \sum_{0}^{n-1}(x_i - z_i)^2$$

for any $x^n=(x_0, x_1, \ldots, x_{n-1})$ and $z^n=(z_0, z_1, \ldots, z_{n-1})$.

The reproduction sequence $\beta(u^n)$ is determined from $u^n$ through a trellis-structured decoder $\beta=(f,g)$, where $f:S \times M_{set} \to S$ is a state transition function, $S=\{s_0, s_1, \ldots, s_{|S|-1}\}$ is a set of states, and $g:S \times M_{set} \to R$ is an output function. The functions f and g determine the trellis structure and the set of reproduction levels (similar to a color palette), respectively. Given an initial state $s_{i_o}$, the reproduction sequence $\beta(u^n(z_0, z_1, \ldots, z_{n-1})$ is computed as follows:

$$z_j = g(s_{i_j}, u_j)$$

$$s_{i_{j+1}} = f(s_{i_j}, u_j)$$

$$j=0, 1, \ldots, n-1 \quad (2.3)$$

In other words, upon receiving $u^n$, the decoder $\beta$ outputs the reproduction sequence $\beta(u^n(z_0, z_1, \ldots, z_{n-1})$ while traversing the sequence of states $s_{i_0}, s_{i_1}, \ldots, s_{i_n}$.

Fix $\beta$. Select l to be the $k^{th}$-order static arithmetic codeword length function $L_k^W$ with $k^{th}$-order transition probability function $W(u|u^k)$. The Viterbi algorithm can then be used to find the optimal sequence $u^n$:

$$u^n = \arg\min_{v^n=(v_0, v_1, \ldots, v_{n-1}) \in M^n}[n^{-1}L_k^W(v_0, v_1, \ldots, v_{n-1}) + \lambda n^{-1}\rho(x^n, \beta(v^n))] \quad (2.4)$$

Fix f. The joint optimization of g, $u^n$, and $L_k^W$ (or equivalently $W(u|u^k)$ can be described)

$$\min_{g,W} \min_{u^n \in M^n}[n^{-1}L_k^W(u^n) + \lambda n^{-1}\rho(x^n, \beta(u^n))] \quad (2.5)$$

An alternating algorithm was proposed in [19] to solve the joint optimization problem (2.5). The procedure of this alternating algorithm is as follows:

Step 1: Set t=0, Select an output function $g^{(o)}$ and a transition probability function $W^{(0)}$ satisfying $$W^{(0)}(u|u^k) > 0 \text{ for any } u \in M_{set} \text{ and } u^k \in M_{set}^k.$$

Step 2: Fix $g^{(t)}$ and $W^{(t)}$. Use the Viterbi algorithm to find a sequence $(u^n)^{(t)}=(u_0^{(t)}, u_1^{(t)}, \ldots, u_{n-1}^{(t)})$ satisfying Equation (2.4) with g replaced by $g^{(t)}$ and W by $W^{(t)}$.

Step 3: Fix $(u^n)^{(t)}$. The index sequence $(u^n)^{(t)}$ gives rise to the update of transition probability function and output function as $$W^{(t+1)}(u|u^k) = \frac{|\{j : u_j^{(t)} = u, (u_{j-k}^{j-1})^{(t)} = u^k, 0 \leq i \leq n\}|}{|\{j : (u_{j-k}^{j-1})^{(t)} = u^k, 0 \leq j < n\}|},$$

$$u^k \in M_{set}^k, u \in M_{set}$$

and $$g^{(t)}(s, u) = \frac{\sum_{s,u} x_j}{|\{j : s_{i_j} = s, u_j^{(t)} = u, 0 \leq j < n\}|}, s \in S, u \in M_{set}$$

where $u_{j-k}^{j-1} = u_{j-k} \ldots u_{j-1}$, $s_{i_j}$, $j=0, 1, \ldots, n-1$, are the states traversed by the trellis decoder $(f, g^{(t)})$ in response to $(u^n)^{(t)}$, and $\Sigma_{s,u}$ is taken over all j satisfying $s_{i_j} = s$ and $u_j^{(t)} = u$.

Step 4: Repeat steps 2 to 3 for t=0, 1, 2, . . . until $$\left|n^{-1}L_k^{W^{(t)}}((u^n)^{(t)}) + \lambda n^{-1}\rho(x^n, \beta^{(t)}((u^n)^{(t)})) \right. \\ \left. - [n^{-1}L_k^{W^{(t+1)}}((u^n)^{(t+1)}) + \lambda n^{-1}\rho(x^n, \beta^{(t+1)}((u^n)^{(t+1)}))]\right| \leq \xi$$

where $\xi$ is a prescribed small threshold, and $L_k^{W^{(t)}}$ is the $k^{th}$-order static arithmetic codeword length function associated with $k^{th}$-order transition probability function $W^{(t)}(u|u^k)$. Then output $g^{(t+1)}$, $(u_n)^{(t+1)}$, and $W^{(t+1)}$.

The performance of VRTSE is asymptotically close to the rate-distortion limit, as shown by Theorems 3 and 4 in reference [19]. The experimental results over Gaussian, Laplacian, Gauss-Markov sources show that VRTSE is especially suitable for low-rate coding. To apply VRTSE to color image encoding the following problems must be addressed:

Problem 1: The lossless codeword length function used in VRTSE is a $k^{th}$-order static arithmetic codeword length function $L_k$. On the other hand, in the present example of color image encoding, the lossless codeword length function is the Lempel-ziv codeword length function $l_{LZ}$.

Problem 2: In VRTSE, the initialization step, Step 1, is unspecified. That is, how to select the initial functions $g^{(0)}$ and $W^{(0)}$ is left open in VRTSE. This translates, in our color image encoding setting, into how to design an initial color image encoding scheme.

Problem 3: To reduce its computational complexity, the index set $M_{set}$ in VRTSE is often chosen to be binary with $M_{set}=2$ so that a high order arithmetic codeword length can be used. On the other hand, in color image encoding, the cardinality M is usually relatively large, and could be as large as 256. Therefore, a new way to reduce the computational complexity is needed.

To get around Problem 1, we will upper bound the Lempel-ziv codeword length function $l_{LZ}$. If $l_{LZ}$ is the codeword length function of LZ78, then it follows from the lossless source coding literature (see, for example, [14]) that for any sequence $u^n=(u_0, u_1, \ldots, u_{n-1})$, $$\frac{1}{n}l_{LZ}(u^n) \leq r_k(u^n) + q_k \frac{\log\log n}{\log n} \qquad (2.6)$$

where $r_k(u^n)$ is the $k^{th}$-order empirical entropy of $u^n$ in bits per symbol, $q_k$ is a) constant depending only on k, and log stands for the logarithm relative to base 2. A similar upper bound is also valid if $l_{LZ}$ is the codeword length function of LZ77. Instead of minimizing $$\frac{1}{n}l_{LZ}(u^n)$$

subject to a distortion constraint, we will minimize $r_k(u^n)$ subject to the same distortion constraint in VRTCQ 1. A) different upper bound will be used in VRTCQ 2. Problems 2 to 3 are addressed below.

Entropy-Constrained Hierarchical Merging Quantization

According to an aspect of the invention, problem 2 is addressed through an entropy-constrained hierarchical merging quantization (ECHMQ), which provides an initial color image encoding scheme for VRTSE. ECHMQ serves as the first stage, Stage 1, for both VRTCQ 1 and VRTCQ 2.

ECHMQ is hard-decision quantization, which partitions the original N colors into M non-overlapped clusters, finds a reproductive color for each cluster, and determines the reproductive color for each original color regardless of the position of the original color in the 2-dimensional image. It takes advantage of the octree data structure [3] and trades off the rate and distortion by locally minimizing an entropy-constrained cost, which is defined below.

Given an n-pixel color image with a color palette $O=\{o_0, o_1, \ldots, o_{N-1}\}$ and desired new color palette size M<N, we use a hard-decision quantizer q to partition the N colors into M clusters $C_0, C_1, \ldots, C_{M-1}$ which satisfy, for $i \neq j$, and $0 \leq i, j < M$ $$C_i \cap C_j = \emptyset$$

$$C_0 \cup C_1 \cup \ldots \cup C_{M-1} = O \qquad (3.7)$$

The integer forms of the centroids of clusters constitute the color palette $C=\{c_0, c_1, \ldots, c_{M-1}\}$, and the mapping from an original color to a cluster explicitly maps each pixel to an index. Let $u^n=(u_0, u_1, \ldots, u_{n-1}) \in M_{set}^n$ be the index sequence obtained from mapping all pixels to indices. Then the entropy-constrained cost of the quantized image is defined as:

$$J(q)=R(q)+\lambda D(q) \qquad (3.8)$$

where $\lambda$ is a Lagrangian multiplier. In (3.8), D(q) is the total square error $$D(q) = \sum_{j=0}^{M-1} \sum_{o_k \in C_j} F(o_k)d(o_k, c_j) \qquad (3.9)$$

where $F(o_i)$, with $0 \leq i < N$, is the number of occurrences of color $o_i$ in the original color image, and $d(o_k, c_j)$ is the square of Euclidean distance between two colors in RGB space, as defined in Equation (1.1). R(q) is the codeword length of the index sequence $u^n$. Since the mapping from a color to an index is independent of the color's position in the color image, the first order entropy is used to calculate the codeword length:

$$R(q) = \sum_{j=0}^{M-1} \left[ \left( \sum_{o_k \in C_j} F(o_k) \right) \log \frac{n}{\sum_{o_k \in C_j} F(o_k)} \right] \qquad (3.10)$$

The cost function defined in Equation (3.8) is similar to the Lagrangian function defined in entropy-constrained vector quantization (ECVQ) in reference [18]. The main issue is to design a hard-decision quantizer q with a good rate distortion trade-off and low encoding complexity. An octree structure is used to speed up the merging and the cost function defined in Equation (3.8) to trade off the rate and distortion of the quantized image.

Figure 2:
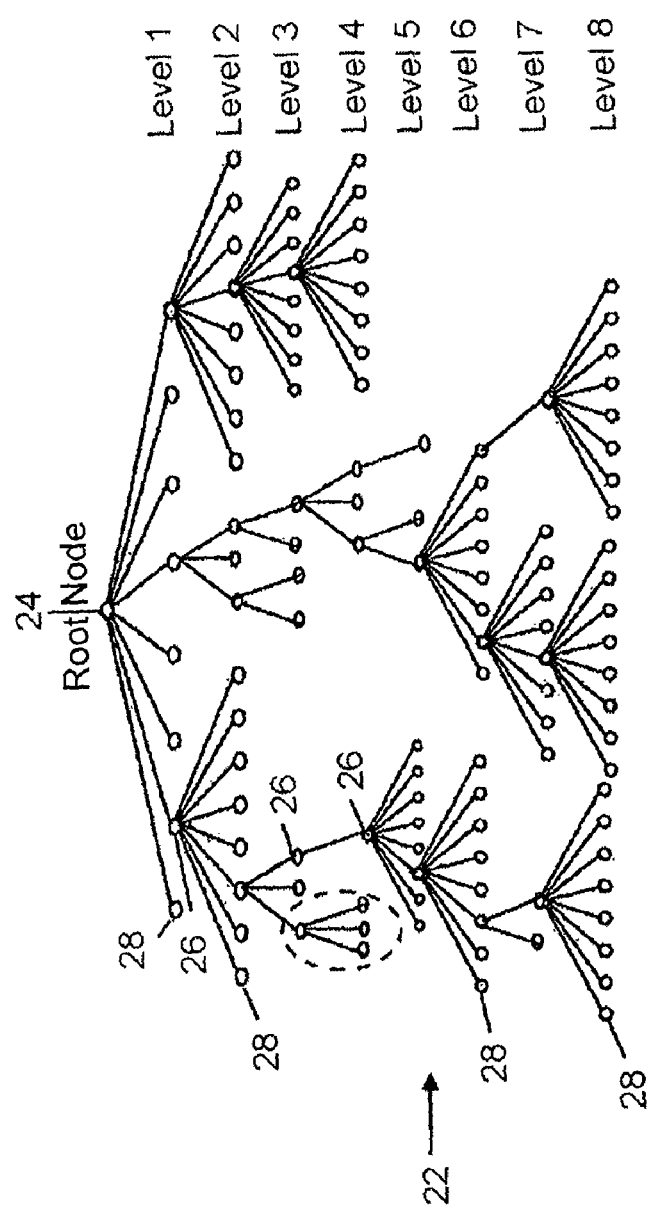
FIG. 2, in a graph, illustrates a octree structure in accordance with a preferred aspect of the invention.

Unlike the on-the-fly octree building procedure which scans the color of each pixel and inserts it in the tree [3], we get the histogram of the original color image and build the initial octree once. Referring to FIG. 2, there is illustrated in a graph, an octree 22, which contains all the distinct colors and their occurrences in an original color image. Root node 24, i.e. level 0, includes all the distinct colors in the color image. Since each color in the RGB color space consists of three 8-bit bytes, each of which represents a primary component, the most significant bits of the three bytes determine the position of the color in level 1. As long as more than one color passes a node, that node is an intermediate node 26 and should be further split according to the combination of the less significant RGB bits. The color passing a leaf node 28 is called a color in that leaf node 28, and the color itself is actually the centroid for that leaf node. The distance, in each color component direction, between the centroids of any two leaf sibling nodes at level k, falls into the range of $(0, 2^{9-k})$. Obviously, the larger k is, the more similar those centroid colors are. Note that the octree 22 shown in FIG. 2 is highly unbalanced and asymmetrical for two reasons: first, the number of colors that appear in an ordinary color image is far less than the total number of $2^{24}$ colors available in RGB space—see reference [17]; second, a node stops splitting if there is only one color passing it.

Each distinct color $o_i$ in the original color image is now put in a distinct leaf node $\Theta_i$ in the octree. By repeatedly merging two leaf sibling nodes each time, we can reduce the number of leaf nodes from N to M. The integer form of the centroid of each resulting leaf node is a color in the new color palette.

Note that after repeated merger of leaf sibling nodes, each leaf node corresponds to a subset of colors in the color palette of the original color image.

Assume $O=\{o_0, o_1, \ldots, o_{N-1}\}$ is the color palette of the original color image. Let $\Theta_i$ and $\Theta_j$ be two leaf sibling nodes under the parent node $\Theta$, where $\Theta_i=\{o_{i_0}, o_{i_1}, \ldots, o_{i_{m-1}}\}$, $\Theta_j=\{o_{j_0}, o_{i_1}, \ldots, o_{j_{k-1}}\}$. and $\Theta_i \cap \Theta_{j=\varnothing}$. Let $c_i$ be the centroid color for $\Theta_i$, and $c_j$ the centroid color for $\Theta_j$. The number $F_i$ of occurrences of the node $\Theta_i$ is defined as the sum of the number of occurrences of each color in node $\Theta_i$ $$F_i \stackrel{\Delta}{=} F_{i_0} + F_{i_1} + \ldots + F_{i_{m-1}}$$

where F denotes the number of occurrences of the color $o_{i_t}$ in the original image. The number $F_j$ of occurrences of the node $\Theta_i$ is calculated in a similar manner:

$$F_j \stackrel{\Delta}{=} F_{j_0} + F_{j_1} + \ldots + F_{j_{k-1}}$$

where $F_{j_t}$ denotes the number of occurrences of the color $o_{j_t}$ in the original image. By merging the two nodes $\Theta_i$ and $\Theta_j$ to a new node $\Theta_{ij}$, we move all colors in $\Theta_i$ and $\Theta_j$ to the new node $\Theta_{ij}$, i.e. $\Theta_{ij}=\Theta_i \cup \Theta_j=\{o_{i_0}, o_{i_1}, \ldots, o_{i_{m-1}}, o_{j_0}, o_{j_1}, \ldots, o_{j_{k-1}}\}$. Accordingly, the number of occurrences of the node $\Theta_{ij}$ is $F_{ij}=F_i+F_j$. Assume that real-valued colors are allowed. The following lemma gives the entropy-constrained cost increment resulting from merging $\Theta_i$ and $\Theta_j$ to $\Theta_{ij}$.

Lemma 1: By merging nodes $\Theta_i$ and $\Theta_j$, the entropy constrained cost is increased by $$\Delta J = \lambda(F_i d(c_i, c_{ij}) + F_j d(c_j, c_{ij})) + F_{ij}\log\frac{n}{F_{ij}} - F_i\log\frac{n}{F_i} - F_j\log\frac{n}{F_j} \quad (3.11)$$

where $c_{ij}$ is the centroid of the node $\Theta_{ij}$, i.e.

$$c_{ij} = \frac{1}{F_{ij}}(F_i c_i + F_j c_j) \quad (3.12)$$

Proof: The minimum total square error is achieved when we reproduce all elements in a cell with the centroid of that cell. This is the centroid condition, S. P. Lloyd, "Least squares quantization in pcm," *IEEE Trans. on Information Theory*, no. 28, pp. 127-135, March 1982 (hereinafter "reference [21]"), widely used in quantization methods. In this paper, we use the centroid of a leaf node as the quantization level, i.e. reproduction color, for all colors in that node. By this means, the entropy-constrained cost for each possible merger can be calculated without calculating the difference between the total entropy-constrained cost before the merger, and the total entropy-constrained cost after the merger.

Since $$F_i c_i = \sum_{p=0}^{m-1} F_{i_p} o_{i_p} \text{ and } F_j c_j = \sum_{q=0}^{k-1} F_{j_q} o_{j_q},$$

the centroid of the new node $\Theta_{ij}$ is.

$$c_{ij} = \frac{1}{\sum_{p=0}^{m-1} F_{i_p} + \sum_{q=0}^{n-1} F_{j_q}} \left( \sum_{p=0}^{m-1} F_{i_p} o_{i_p} + \sum_{q=0}^{k-1} F_{j_q} o_{j_q} \right)$$

$$= \frac{1}{F_{ij}}(F_i c_i + F_j c_j).$$

Equation (3.11) for the increased entropy-constrained cost $\Delta J$ can be proved by calculating the increased square error $\Delta D$ and increased codeword length $\Delta R$ separately. Let $D_{\Theta_i}$ denote the total square error caused by using $c_i$ as the quantization level for $\Theta_i$. Then $$D_{\Theta_i} = \sum_{p=0}^{m-1} F_{i_p} \|o_{i_p} - c_i\|^2.$$

Similarly, we have $$D_{\Theta_j} = \sum_{q=0}^{k-1} F_{j_q} \|o_{j_q} - c_j\|^2$$

and $$D_{\Theta_{ij}} = \sum_{p=0}^{m-1} F_{i_p} \|o_{i_p} - c_{ij}\|^2 + \sum_{q=0}^{k-1} F_{j_q} \|o_{j_q} - c_{ij}\|^2.$$

Substituting $c_{ij}$ with the expression in Equation (3.12) and simplifying the expression for $D(\Theta_{ij})$ we get $D_{\Theta_{ij}}=D_{\Theta_i}+D_{\Theta_j}+F_i d(c_i, c_{ij})+F_j d(c_j, c_{ij})$. Therefore, $$\Delta D = D_{\Theta_{ij}} - (D_{\Theta_i} + D_{\Theta_j}) = F_i d(c_i, c_{ij}) + F_j d(c_j, c_{ij})$$

Let $R_{\Theta_i}$ denote the total number of bits resulting from entropy coding all pixels with colors in node $\Theta_i$. Then $$R_{\Theta_i} = F_i \log\frac{n}{F_i}.$$

Similarly, we have $$R_{\Theta_j} = F_j \log\frac{n}{F_j} \text{ and } R_{\Theta_{ij}} = F_{ij}\log\frac{n}{F_{ij}}.$$

Thus, $$\Delta R = R(\Theta_{ij}) - (R(\Theta_i) + R(\Theta_j)) = F_{ij}\log\frac{n}{F_{ij}} - F_i\log\frac{n}{F_i} - F_j\log\frac{n}{F_j}$$

which, together with $\Delta D$, implies (3.11). This completes the proof of Lemma 1.

Lemma 1 provides rules for merging two leaf sibling nodes. Our purpose at stage 1 is to produce a hard-decision quantizer that will give an efficient trade-off between the rate and distortion of the quantized image. Since the original color palette is finite, one could find a globally optimal hard-decision quantizer by searching through all possible combinations. However, such a method has high computational complexity and hence is not feasible for real time compression. Lemma 1 suggests an alternative—a greedy method to design a tree-structured hard-decision quantizer. Based on the original octree with N leaf nodes, one can repeatedly merge two leaf sibling nodes with the minimum increment of the entropy-constrained cost until M leaf nodes are left. Such a method, dubbed entropy-constrained hierarchical merging quantization (ECHMQ), is fast and gives a reasonably good trade-off between the rate and distortion of the quantized image. The detailed steps of the ECHMQ are as follows:

Step 1: Read the n-pixel original color image $X=(x_0, x_1, \ldots, x_{n-1})$ and get the color palette $O=\{o_0, o_1, \ldots, o_{N-1}\}$ and the number of occurrences $f_i$ for each color $o_i$ where $0 \leq i < N$.

Step 2: Build the octree by inserting each color $o_i$ into the tree as a distinct leaf node $\Theta_i$. And for each leaf node $\Theta_i$, $0 \leq i < N$, compute its centroid $c_i = o_i$, TSE $D_{\Theta_i} = 0$, number of occurrences $F_i = f_i$, and codeword length $$R_{\Theta_i} = F_i \log \frac{n}{F_i}.$$

Step 3: Let k=N.

Step 4: Compute, for every two leaf sibling nodes $\Theta_i$ and $\Theta_j$, the centroid $c_{ij}$ by Equation (3.12) and the increased entropy-constrained cost by Equation (3.11).

Step 5: Choose, among all pairs of leaf sibling nodes, the two leaf sibling nodes $\Theta_p$ and $\Theta_q$, that minimize the increased entropy-constrained cost calculated in the previous step. Merge $\Theta_p$ and $\Theta_q$, into a new leaf node $\Theta_{pq}$ which is equal to the parent node of $\Theta_p$ and $\Theta_q$, if $\Theta_p$ and $\Theta_q$, are the only siblings under their parent node, and to a new combined leaf node under the parent node of $\Theta_p$ and $\Theta_q$, otherwise. Compute the centroid $c_{pq}$ of $\Theta_{pq}$, $F_{pq} = F_p + F_q$, $D_{\Theta_{pg}} = D_{\Theta_p} + D_{\Theta_g} + F_p d(c_p, c_{pq}) + F_q d(c_q, c_{pq})$, and $$R_{\Theta_{pq}} = F_{pq} \log \frac{n}{F_{pq}}.$$

Step 6: Remove leaf nodes $\Theta_p$ and $\Theta_q$ from the octree.

Step 7: Decrease k by 1.

Step 8: Repeat steps 4 to 7 until k=M. Then assign a distinct index $i \in M_{set}$ to each of the remaining M leaf nodes in the final octree. The integer form of the centroid of a leaf node is a distinct color in the new color palette, and all colors in that leaf node are mapped to the index corresponding to that leaf node.

When the desired number of colors is reached, the final entropy-constrained cost for quantizing the original image is $$J = J_N + \Delta J_N + \Delta J_{N-1} + \ldots + \Delta J_{M+1} = J_N + \sum_{i=N}^{M+1} \Delta J_i,$$

where $J_N$ is the cost of the original image with N distinct colors, and $\Delta J_i$ is the increased cost when we merge two selected leaf nodes and decrease the number of leaf nodes in the octree from i to i−1. By finding the minimum increased entropy-constrained cost each time when we merge two leaf sibling nodes in the octree, ECHMQ provides a locally optimal way to minimize the entropy-constrained cost.

ECHMQ aims to minimize (locally) the entropy-constrained cost, rather than the pure distortion TSE. Therefore, the rate and distortion of the quantized image are controlled and traded off by the Lagrangian multiplier $\lambda$. As $\lambda$ increases, the average distortion decreases, and the corresponding rate increases. Indeed, $-\lambda$ can be interpreted as the slope of the resulting rate distortion curve. Thus, in ECHMQ, we have the flexibility to use $\lambda$ as a trade-off factor to vary the rate and distortion of the quantized image.

Another advantage of ECHMQ is its low computational complexity. To illustrate this, suppose initially we have total 256 leaf nodes which are all located at level 8, under 32 parent nodes at level 7. To decrease the number of leaf nodes to 255, we need to calculate the increased entropy-constrained cost for $$32 \times \frac{8!}{2! \times 6!} = 896 \text{ pairs of leaf sibling nodes.}$$

pairs of leaf sibling nodes. If the octree structure is not used, we need to calculate the increased cost for $$\frac{256!}{2! \times 254!} = 32640 \text{ pairs,}$$

pairs, which is basically used by the pairwise clustering in [5]. Rewrite Equation (3.11) as $$\Delta J = \lambda \{F_i[(r_{c_i} - r_{c_{ij}})^2 + (g_{c_i} - g_{c_{ij}})^2 + (b_{c_i} - b_{c_{ij}})^2] + + F_j$$
$$\lfloor (r_{c_j} - r_{c_{ij}})^2 + (g_{c_j} - g_{c_{ij}})^2 + (b_{c_j} - b_{c_{ij}})^2 \rfloor\} + F_{ij} \log \frac{n}{F_{ij}} (R_{\Theta_i} + R_{\Theta_j})$$

we see the calculation of the increased cost for each pair of leaf sibling nodes involves 8 additions, 7 subtractions, 10 multiplications, 1 division, and 1 log operation. Compared with the high computation spent in other methods, such as the TSE-based hierarchical splitting method [2] which employs Jocobi method for each splitting, ECHMQ enjoys very low complexity. Also the palette and the pixel mapping are easily obtained at Step 8; this again compares favorably with other methods in literature, such as those described in references [5] and [6], where a significant amount of computation is involved in palette design and pixel mapping.

If we skip the further optimization described below, the new color palette and pixel mapping obtained at the end of the ECHMQ can be encoded directly by GIF/PNG encoder. To be specific, in what follows, we will use a PNG encoder as the entropy coder. Replacing the PNG encoder with an available GIF encoder, we easily have our output compatible with a GIF decoder.

VRTCQ 1

In this section, we will adopt soft-decision quantization to further jointly optimize the compression rate and distortion of a quantized color image while maintaining compatibility with GIF/PNG decoder. Using the hard-decision quantizer obtained at the end of ECHMQ as an initial color image encoding scheme, we will extend VRTSE to color image encoding, yielding VRTCQ 1.

Let us begin with the VRTSE setting of VRTCQ 1. Since we want to maintain compatibility with GIF/PNG decoder, the output function g can not depend on any state. In other words, the state set S consists of only $s_0$. In this case, the state transition function $f$ can be dropped, the output function g is simply a mapping from $M_{set}$ to the RGB space, defining the correspondence between indices and colors in the color palette, and the trellis decoder is degraded to $\beta=g$. Given the original color image $x^n$ ($x_0, x_1, \ldots, x_{n-1}$), we define for any sequence $u^n=(u_0, u_1, \ldots, u_{n-1}) \in M_{set}^n$ $$d(x^n, g(u^n)) = \sum_{i=0}^{n-1} d(x_i, g(u_i))$$

We will use the upper bound given in (2.6), and minimize $r_k(u^n)$ subject to a distortion constraint. To be specific, let k=1. However, the procedure described below can be easily extended to any k.

The initial output function $g^{(0)}$ and transition probability function $W^{(0)}$ can be derived from the color palette and pixel mapping obtained at the end of ECHMQ. The detailed procedure of VRTCQ 1 is described as follows:

Step 1: Set t=0. Obtain $(u^n)^{(0)}$, $g^{(0)}$ and $W^{(0)}$ from ECHMQ: $(u^n)^{(0)}=(u_0^{(0)}, u_1^{(0)}, \ldots, u_{n-1}^{(0)})$ is the index sequence of the quantized image resulting from the hard-decision quantizer, $g^{(0)}(j)$, $0 \leq j < M$, is the color, corresponding to index j, in the new color palette obtained at the end of ECHMQ, and $$W^{(0)}(\alpha | w) = \frac{|\{i : u_i^{(0)} = \alpha, u_{i-1}^{(0)} = w, 0 \leq i < n\}|}{|\{i : u_{i-1}^{(0)} = w, 0 \leq i < n\}|}$$

for any $\alpha \in M_{set}$ and $w \in M_{set}$. Also calculate the initial cost $$J^{(0)} = n^{-1} L_1^{W^{(0)}((u^n)^{(0)})} + \lambda n^{-1} d(x^n, g^{(0)}((u^n)^{(0)}))].$$

Step 2: Fix $g^{(t)}$ and $W^{(t)}$. Use the Viterbi algorithm to find a sequence $(u^n)^{(t+1)} = (u_0^{(t+1)}, u_1^{(t+1)}, \ldots, u_{n-1}^{(t+1)})$ satisfying Equation (2.4) with g replaced by $g^{(t)}$ and W by $W^{(t)}$.

Step 3: Fix $(u^n)^{(t+1)}$. The index sequence $(u^n)^{(t+1)}$ gives rise to the update of transition probability function and output function as $$W^{(t+1)}(\alpha | w) = \frac{|\{i : u_i^{(t+1)} = \alpha, u_{i-1}^{t+1} w, 0 \leq i < n\}|}{|\{i : u_{i-1}^{(t+1)} = w, 0 \leq i < n\}|}$$

for any $\alpha \in M_{set}$ and $W \in M_{set}$, and $$g^{(t+1)}(u) = \frac{\sum_u x_i}{|\{i : u_i^{(t+1)} = u, 0 \leq i < n\}|}$$

for any $u \in M_{set}$, where $\Sigma_u$ is taken over all i for which $u_i^{(t+1)} = u$. Note that $x_i$ represents the color of the $i^{th}$ pixel in the original image.

Step 4: Compute the updated cost $$J^{t+1} = n^{-1} L_1^{W^{(t+1)}((u^n)^{(t+1)})} + \lambda n^{-1} d(x^n, g^{(t+1)}((u^n)^{(t+1)}))].$$

Step 5: Repeat Steps 2 to 4 for t=0, 1, 2, . . . : until $J^{(t)} - J^{t+1} < \xi$, where $\xi$ is a prescribed threshold.

Then output $g^{(t+1)}$ and $(u^n)^{(t+1)}$.

Step 6: Encode the color palette $g^{(t+1)}$ and the index sequence $(u^n)^{(t+1)}$ using the PNG encoder described in [17].

Figure 3:
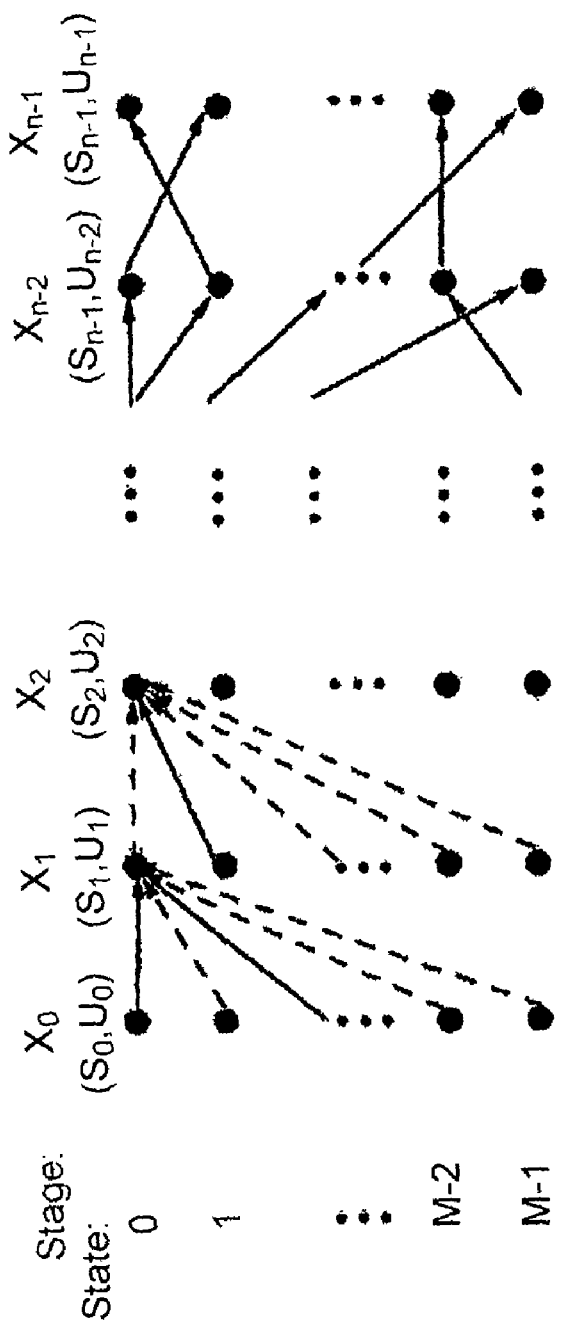
FIG. 3, in a graph, illustrates a Viterbi algorithm in accordance with a first variant of a soft-decision optimization aspect of the present invention.

Steps 2 to 6 can be conveniently referred to as Stage 2 of VRTCQ 1. The Viterbi algorithm used here is depicted in a graph shown in FIG. 3. The increased cost from stage to stage is calculated as:

$$-\log W(u_i|u_{i-1}) + d(x_i, g(u_i)) \tag{4.13}$$

where $s_i = u_i$ for any $0 \leq i < n$. To find the survivor path reaching state j at stage i, we need to compare the M accumulated costs, each of which requires 3 additions, 3 subtractions, and multiplications. Therefore the total computational complexity is $O(nM^2)$.

The optimality of Stage 2 is demonstrated by Theorem 3 in [19]. Overall, VRTCQ 1 jointly optimizes the rate and distortion of the quantized color image, to some extent, while maintaining compatibility with GIF/PNG decoder. Experiments show that the convergence is reasonably fast; typically, after 2 to 3 iterations, $J^{(t)}$ is very close to its limit.

We conclude this section considering the overall computational complexity of VRTCQ 1. In comparison with Stage 2, Stage 1 of VRTCQ 1, i.e., the ECHMQ, has much lower computational complexity. Therefore, the main computational complexity of VRTCQ 1 lies in Stage 2, particularly in the Viterbi algorithm. Since each iteration of the Viterbi algorithm has computational complexity $O(nM^2)$, the overall computational complexity of VRTCQ 1 may be inconveniently high for real time compression when M is large. Therefore, it is desirable to reduce computational complexity in the case of large M. This problem is addressed by VRTCQ 2.

VRTCQ 2

To reduce the computational complexity of VRTCQ 1 in the case of large M, we now upper bound the Lempel-Ziv codeword length function in a way different from (2.6). To this end, we define a new information quantity different from the $k^{th}$-order empirical entropy $r_k(u^n)$. Let M' be an integer strictly less than M. Let b(•) be a mapping from $M_{set} = \{0, 1, \ldots, M-1\}$ onto $M'_{set} = \{0, 1, \ldots, M'-1\}$. In terms of b, we partition $M_{set}$ into M' groups $\{i \in M_{set} : b(i) = j\} j = 0, 1, \ldots, M'-1$. For any $u^n = (u_0, u_1, \ldots, u_{n-1}) \in M_{set}^n$, let $$b(u^n)(b(u_0), b(u_1), \ldots, b(u_{n-1}))$$

Define $$r(u^n | b(u^n)) \triangleq \sum_{j=0}^{M'-1} \sum_{i=0}^{M-1} \left| \{t : 0 \leq t < n, u_t = i, b(u_t) = j\} \right|$$

$$\log \frac{|\{t : 0 \leq t < n, b(u_t) = j\}|}{|\{t : 0 \leq t < n, u_t = i, b(u_t) = j\}|}$$

The quantity $r(u^n|b(u^n))$ is called the conditional empirical entropy of $u^n$ given $b(u^n)$. Our desired information quantity is defined as $$r_k^*(u^n) = r_k(b(u^n)) + r(u^n|b(u^n))$$

where $r_k(b(u^n))$ is the $k^{th}$-order empirical entropy of $b(u^n)$. It is not hard to show that $$r_k(u^n) \leq r_k^*(u^n) + O\left(\frac{\log n}{n}\right)$$

Thus, in view of (2.6), the Lempel-Ziv codeword length function $l_{LZ}$ can also be upper bounded by $$\frac{1}{n} l_{LZ}(u^n) \leq r_k^*(u^n) + O\left(\frac{\log \log n}{\log n}\right) \qquad (5.14)$$

Instead of minimizing $r_k(u^n)$ subject to a distortion constraint, we) now minimize $r_k^*(u^n)$ subject to a distortion constraint in VRTCQ 2. Similar to the fact that $nr_k(u^n)$ is the minimum codeword length afforded by all $k^{th}$-order static arithmetic codeword length functions $L_k^W$, $nr_k^*(u^n)$ is also related to codeword length functions. Let $W_S(s|s^k)$ be a probability transition function from) $M'_{set}{}^k$ to $M'_{set}$ and $W_U(u|s)$ a probability transition function from $M'_{set}$ to $M_{set}$. For any $u^n = (u_0, u_1, \ldots, u_{n-1}) \in M'_{set}{}^n$ let $$L_{W_S}^{W_U}(u^n) = \qquad (5.15)$$
$$-\sum_{t=0}^{n-1} [\log W_S(b(u_t) | b(u_{t-1}) \ldots b(u_{t-k})) + \log W_U(u_t | b(u_t))]$$

It is easy to see that $L_{W_S}^{W_U}$ is a codeword length function corresponding to a lossless code via which $u^n$ is encoded by first using a $k^{th}$-order static arithmetic code with transition probability $W_S$ to encode $b(u^n)$, and then encoding $u^n$ conditionally given $b(u^n)$ Moreover, it is not hard to show that $$nr_k^*(u^n) = \min_{W_S, W_U} L_{W_S}^{W_U}(u^n) + O(\log n)$$

Accordingly, given the mapping b, the joint optimization problem in VRTCQ 2 becomes $$\min_{g, W_S, W_U} \min_{u^n \in M_{set}^n} \left[n^{-1} L_{W_S}^{W_U}(u^n) + \lambda n^{-1} d(x^n, g(u^n))\right] \qquad (5.16)$$

To be specific, let k=1. Nonetheless, all arguments and procedures below apply to the general k as well. Given g, $W_S$, and $W_U$, the inner minimization in (5.16) can be solved by the Viterbi algorithm with complexity of $O(nM^2)$ instead of $O(nM^2)$. To see this is the case, note that in view of (5.15), the cost increases, each time as t increases, by $$-\log W_S(b(u_t)|b(u_{t-1})) - \log W_U(u_t|b(u_t)) + \lambda d(x_t, g(u_t)) \qquad (5.17)$$

In (5.17), only the first term relies on the past through $b(u_{t-1})$. Therefore, one can build a trellis with state set $$S \triangleq M'_{set}$$

and full connection between states of two consecutive stages, and then run the Viterbi algorithm on the trellis to solve the inner minimization problem. Before running the Viterbi algorithm, we compute the minimum sub-cost $$c(s, x) \triangleq \min_{u \in \{i: 0 \leq i < M, b(i) = s\}} [-\log W_U(u|s) + \lambda d(x, g(u))]$$

for every combination of (s,x), where $s \in M'_{set}$ and $x \in O$. The minimum sub-cost and the corresponding color index u achieving the minimum sub-cost for that pair (s,x) are kept in a look-up table. The cost over the transition from a state $S_{t-1} \in M'_{set}$ at Stage t-1 of the trellis to a state $s_t$ at Stage t of the trellis is $-\log W_S(s_t|s_{t-1}) + c(s_t, x_t)$. Given the original image $x^n = (x_0, x_1, \ldots, x_{n-1})$, if $s^n = (s_0, s_1, \ldots, s_{n-1}) \in M'_{set}{}^n$ is the optimal path through the trellis, then $u^n = (u_0, u_1, \ldots, u_{n-1})$, where $u_t \in \{i: 0 \leq i < M, b(i) = s_t\}$ achieves the minimum cost $c(s_t, x_t)$, t=0, 1, ..., n-1, is the optimal index sequence achieving the inner minimization in (5.16).

Similar to VRTCQ 1, VRTCQ 2 solves the joint optimization problem (5.16) in an iterative manner. Stage 1 of VRTCQ 2 determines the mapping b, and provides the initial output function $g^{(0)}$ and transition probability functions $W_U^{(0)}$ and $W_S^{(0)}$. Stage 2 of VRTCQ 2 then uses an alternative procedure to solve the minimization problem. The detailed procedures of VRTCQ 2 are described as follows.

A. Procedure of Stage 1

Step 1: Run ECHMQ on the original image to get an octree $T_M$ with M leaf nodes, its color palette of size M, and the corresponding hard-decision pixel mapping.

Step 2: Based on $T_M$, repeat Steps 4 to 7 of the ECHMQ until M' leaf nodes are remaining.

Step 3: Determine the mapping b from the octree $T_M$ to the octree $T_{M'}$ with M' leaf nodes obtained in Step 2, which is a subtree of $T_M$. In particular, $b(i)=j, i \in M_{set}$ and $j \in M'_{set}$ if and only if the $i^{th}$ leaf node of $T_M$ lies in the subtree of $T_M$ rooted at the jth leaf node of $T_{M'}$.

B. Procedure of Stage 2

Step 1: Set t=0. Obtain b, $(u^n)^{(0)}$, $(s^n)^{(0)}$, $g^{(0)}$, $W_U^{(0)}$, and $W_S^{(0)}$ from Stage 1 of the VRTCQ 2, where $(u^n)^{(0)} = (u_0^{(0)}, u_1^{(0)}, \ldots, u_{n-1}^{(0)})$ is the index sequence resulting from the hard decision pixel mapping, $(s^n)^{(0)} = (s_0^{(0)}, s_1^{(0)}, \ldots, s_{n-1}^{(0)}) = b((u^n)^{(0)}, g^{(0)}(u))$ with $0 \leq u < M$, is the color, corresponding to the index u, in the new color palette obtained in Step 1 of Stage 1, $$W_U^{(0)}(u|s) = \frac{|\{i: u_i^{(0)} = u, s_i^{(0)} = s, 0 \leq i < n\}|}{|\{i: s_i = s, 0 \leq i < n\}|}, u \in M_{set}, s \in M'_{set}$$

and $$W_S^{(0)}(\alpha|w) = \frac{|\{i: s_{i-1} = w, s_i = \alpha, 0 \leq i < n\}|}{|\{i: s_{i-1} = w, 0 \leq i < n\}|}, \alpha \in M'_{set}, w \in M'_{set}$$

Also compute the initial cost $$J^{(0)} = n^{-1} L_{W_S^{(0)}}^{W_U^{(0)}}((u^n)^{(0)}) + \lambda n^{-1} d(x^n, g^{(0)}((u^n)^{(0)}))$$

Step 2: Fix $g^{(t)}$ and $W_U^{(t)}$. Build the look-up table. For each pair of (s,x), where $s \in M'_{set}$ and $x \in O$, compute the minimum sub-cost $$c^{(t)}(s, x) = \min_{u \in \{i: 0 \leq i < M, b(i) = s\}} [-\log W_U^{(t)} v(u|s) + \lambda d(x, g^{(t)}(u))]$$

and record the color index $u \in \{i: 0 \leq i < M, b(i) = s\}$ which achieves $c^{(t)}(s, x)$.

Step 3: Fix $g^{(t)} W_U^{(t)}$, and $W_S^{(t)}$. Use the Viterbi algorithm to find the optimal path through the trellis $(s^n)^{(t+1)} = (s_0^{(t+1)},$ $s_1^{(t+1)}, \ldots, s_{n-1}^{(t+1)}$), which, together with b and the look-up table, determines the optimal index sequence $(u^n)^{(t+1)} = (u_0^{(t+1)}, u_1^{(t+1)}, \ldots, u_{n-1}^{(t+1)})$ achieving the inner minimization in (5.16) with g replaced by $g^{(t)}$, $W_U$ by $W_U^{(t)}$, and $W_S$ by $W_S^{(t)}$.

Step 4: Fix $(u^n)^{(t+1)}$ and $(s^n)^{(t+1)}$. These two sequences give rise to the update of transition probability functions and output function as $$W_U^{(t+1)}(u|s) = \frac{|\{i: u_i^{(t+1)} = u, s_i^{(t+1)} = s, 0 \le i < n\}|}{|\{i: s_i^{(t+1)} = w, 0 \le i < n\}|}, u \in M_{set}, s \in M'_{set},$$

$$W_S^{(t+1)}(\alpha|w) = \frac{|\{i: s_{i-1}^{(t+1)} = w, s_i^{(t+1)} = \alpha, 0 \le i < n\}|}{|\{i: s_{i-1}^{(t+1)} = w, 0 \le i < n\}|}, \alpha \in M', w \in M',$$

and $$g^{(t+1)}(u) = \frac{\sum_u x_i}{|\{i: u_i^{(t+1)} = u, 0 \le i < n\}|}, u \in M$$

where $\Sigma_u$ is taken over all i for which $u_i^{(t+1)} = u$.

Step 5: Compute the updated cost $$J^{(t+1)} = n^{-1} L_{W_S^{(t+1)}}^{W_U^{(t+1)}}((u^n)^{(t+1)}) + \lambda n^{-1} d(x^n, g^{(t+1)}((u^n)^{(t+1)}))$$

Step 6: Repeat Steps 2 to 5 for t=0, 1, 2, . . . until $J^{(t)} - J^{(t+1)} \le \xi$, where $\xi$ is a prescribed threshold.

Then output $g^{(t+1)}$ and $(u^n)^{(t+1)}$.

Step 7: Encode the color palette $g^{(t+1)}$ and the index sequence $(u^n)^{(t+1)}$ by the PNG encoder from [17].

Figure 4:
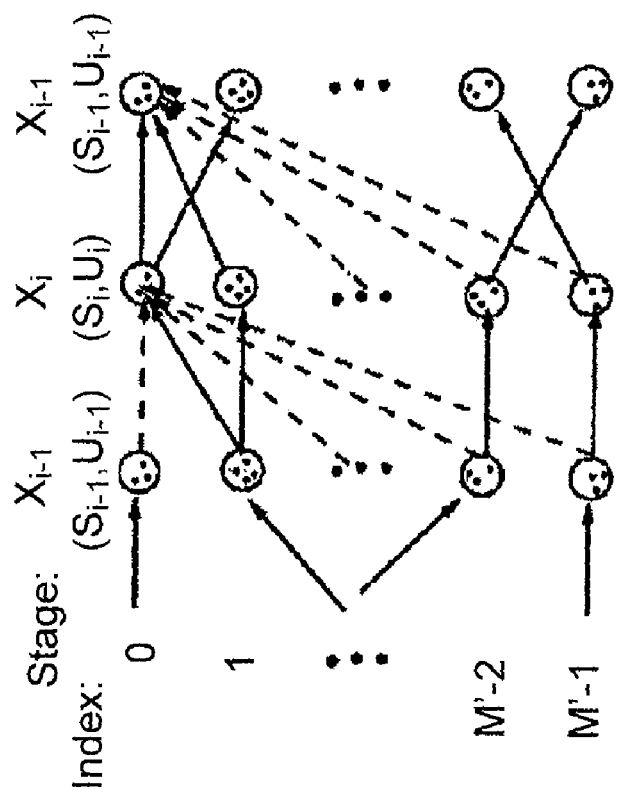
FIG. 4, in a graph, illustrates a Viterbi algorithm in accordance with a second variant of a soft-decision optimization aspect of the present invention; and, FIG. 5, in a block diagram, illustrates a CPU of the computer system of FIG. 1.

The Viterbi algorithm used in Step 3 is depicted in the graph of FIG. 4. In the graph, each circle represents a group, and the black dots within a circle represent all color indices $u \in M_{set}$ in the group.

Similar to VRTCQ 1, the major computational complexity of VRTCQ 2 is still in its Stage 2. Although in comparison with Stage 2 of VRTCQ 1, Stage 2 of VRTCQ 2 has an extra step, Step 2, this step is not computationally intensive. Indeed, its computational complexity is O(NM), which does not depend on the size n of the original image and hence is negligible as compared to the complexity of the Viterbi algorithm when n is large. The Viterbi algorithm in Step 3 of Stage 2 of VRTCQ 2 now has $O(nM'^2)$ computational complexity, which compares favorably with the $O(nM^2)$ computational complexity of the Viterbi algorithm used in VRTCQ 1. Thus when M'<<M, VRTCQ 2 will be much faster than VRTCQ 1. In addition, once M' is fixed, the computational complexity of VRTCQ 2 is more or less independent of M. This makes VRTCQ 2 attractive for color rich images. The price paid in VRTCQ 2 is the slight loss of compression performance in terms of the trade-off between the compression rate and distortion since a loose bound is used to upper bound the Lempel-Ziv codeword length function.

Figure 5:
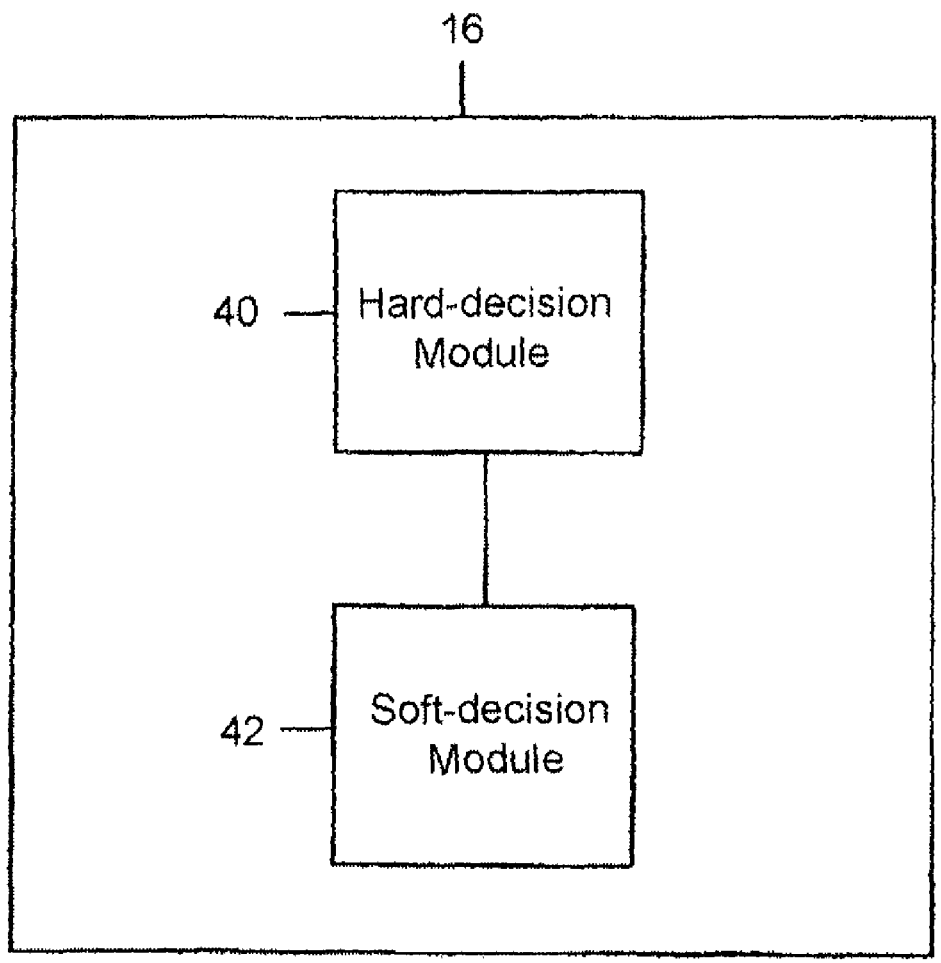

Referring to FIG. 5, there is illustrated in a block diagram, the CPU 16 of the computer system 10 of FIG. 1. As shown, the CPU 16 includes a hard-decision module 40 and a soft-decision module 42. The hard-decision module 40 provides ECHMQ as described above. The soft-decision module 42 provides both VRTCQ 1 and VRTCQ 2 as described above.

As described above, the hard-decision module 40 comprises a node creation sub-module for building an octree structure, a node merging sub-module for selecting and merging leaf nodes, and a cost calculation sub-module for calculating, for potential mergers of pairs of leaf nodes, the entropy-constrained cost increment for each such merger. Similar to the hard-decision module 40, the soft-decision module 42 includes a cost calculation sub-module for determining the incremental reduction in cost after each iteration of soft-decision optimization by the soft-decision module 42.

Other variations and modifications of the invention are possible. For example, as described above, ECHMQ may be used on its own, without using VRTCQ on other soft-decision optimization, to provide a hard decision pixel mapping. Alternatively, VRTCQ may be used without using ECHMQ to provide the initial hard decision pixel mapping. Instead, some other initial hard decision procedure may be provided. Further, other soft decision optimization methods may be used in combination with ECHMQ instead of VRTCQ. Further, while the foregoing description is largely directed to how to jointly address both quantization distortion and compression rate while maintaining low computational complexity and compatibility with standard decoders, such as, for example, the GIF/PNG decoder, it will be apparent to those of skill in the art that both ECHMQ and VRTCQ may be applied to the compression of color image data in other contexts as well. All such modifications or variations are believed to be within the sphere and scope of the invention as defined by the claims appended hereto.

The invention claimed is:

1. A method for deriving a new index sequence representing a pixel mapping and a new output function representing a color palette for a new digitized color image derived from an original digitized color image both defined on n pixels, wherein the original digitized color image is provided by N distinct colors being allocated to the n pixels, the new digitized color image is provided by M distinct colors being allocated to the n pixels, the new index sequence has n index members for representing the n pixels and the new output function is for mapping the n index members to the M colors, the method comprising: (a) directing a data processing device to provide a first new index sequence by partitioning all pixels in the original digitized color image into M disjoint clusters based on a color of each pixel in the original digitized color image, wherein M is less than or equal to N; (b) directing a data processing device to provide a first new output function for providing a one-to-one mapping of the M distinct colors onto the pixels in the M disjoint clusters; (c) directing a data processing device to apply a soft decision optimization process to the first new index sequence and the first new output function to provide the new index sequence and the new output function respectively based on, for each member of the first new index sequence, how a color value assigned to that member by the first new output function correlates with the color value assigned to at least one other member of the first new index sequence by the first new output function.

2. The method as defined in claim 1 wherein the new index sequence provides a soft decision pixel mapping such that, for each pixel in the new digitized color image, the color value assigned to the pixel by the new index sequence and the new output function depends on the location of the pixel in the color image.

3. A method for deriving a new index sequence representing a pixel mapping and a new output function representing a color palette for a new digitized color image derived from an original digitized color image both defined on n pixels, wherein the original digitized color image is provided by N distinct colors being allocated to the n pixels, the new digitized color image is provided by M distinct colors being allocated to the n pixels, the new index sequence has n index members for representing the n pixels and the new output function is for mapping the n index members to the M colors, the method comprising: (a) directing a data processing device to provide a first new index sequence by partitioning all pixels in the original digitized color image into M disjoint clusters based on a color of each pixel in the original digitized color image, wherein M is less than or equal to N; (b) directing a data processing device to provide a first new output function for providing a one-to-one mapping of the M distinct colors onto the pixels in the M disjoint clusters; (c) directing a data processing device to apply a soft decision optimization process to the first new index sequence and the first new output function to provide the new index sequence and the new output function respectively based on, for each member of the first new index sequence, how a color value assigned to that member by the first new output function correlates with the color value assigned to at least one other member of the first new index sequence by the first new output function, and wherein step (c) comprises applying an iterative soft decision optimization process and determining, after each iteration, an incremental reduction in a cost function representing compression and distortion of the original digitized color image, and step (c) terminates and the new index sequence and the new color mapping determined when the incremental reduction falls below a selected threshold.

4. The method as defined in claim 3 wherein step (c) comprises (i) setting a counter k equal to one; (ii) for a k.sup.th index sequence, determining a $(k+1)^{th}$ index sequence by optimizing the cost function, for a $k^{th}$ output function and a $k^{th}$ transition probability function, over all possible index sequences; (iii) determining a $(k+1)^{th}$ output function and a $(k+1)^{th}$ transition probability function from the $(k+1)^{th}$ index sequence; (iv) determining a $(k+1)^{th}$ cost from the $(k+1)_r$. index sequence, the $(k+1)^{th}$ output function and the $(k+1)^{th}$ transition probability function; and, (v) calculating a $(k+1)^{th}$ cost difference between the $(k+1)^{th}$ cost and a $k^{th}$ cost, and, when the $(k+1)^{th}$ cost difference is less than a selected the new index sequence and the new output function respectively, otherwise, increasing k by 1 and repeating sub-steps (ii) to (v).

5. The method as defined in claim 4 wherein in step (ii), the step of determining the $(k+1)^{th}$ index sequence by optimizing the cost function, for the given $k^{th}$ output function and $k^{th}$ transition probability function, over all possible index sequences comprises using a Viterbi algorithm.

6. The method as defined in claim 5 wherein step (a) further comprises grouping the M disjoint clusters into M' disjoint groups, M' being less than M; and, step (c) comprises applying the soft decision optimization process relative to the M' disjoint groups.

7. The method as defined in claim 6 wherein the cost function depends on both M and M'.

8. A data processing system for deriving a new index sequence representing a pixel mapping and a new output function representing a color palette for a new digitized color image derived from an original digitized color image both defined on n pixels, wherein the original digitized color image is provided by N distinct colors being allocated to the n pixels, the new digitized color image is provided by M distinct colors being allocated to the n pixels, the new index sequence has n index members for representing the n pixels and the new output function is for mapping the n index members to the M colors, the data processing system comprising: (a) a hard decision module for (i) providing a first new index sequence by partitioning all pixels in the original digitized color image into M disjoint clusters based on a color of each pixel in the original digitized color image, wherein M is less than or equal to N, and (ii) providing a first new output function for providing a one-to-one mapping of the M distinct colors onto the pixels in the M disjoint clusters; and (b) a soft decision module for applying a soft decision optimization process to the first new index sequence and the first new output function to provide the new index sequence and the new output function respectively based on, for each member of the first new index sequence, how a color value assigned to that member by the first new output function correlates with the color value assigned to at least one other member of the first new index sequence by the first new output function.

9. The data processing system as defined in claim 8 wherein the new index sequence provides a soft decision pixel mapping such that, for each pixel in the new digitized color image, the color value assigned to the pixel by the new index sequence and the new output function depends on the location of the pixel in the color image.

10. A data processing system for deriving a new index sequence representing a pixel mapping and a new output function representing a color palette for a new digitized color image derived from an original digitized color image both defined on n pixels, wherein the original digitized color image is provided by N distinct colors being allocated to the n pixels, the new digitized color image is provided by M distinct colors being allocated to the n pixels, the new index sequence has n index members for representing the n pixels and the new output function is for mapping the n index members to the M colors, the data processing system comprising: (a) a first decision module for (i) providing a first new index sequence by partitioning all pixels in the original digitized color image into M disjoint clusters based on a color of each pixel in the original digitized color image, wherein M is less than or equal to N, and (ii) providing a first new output function for providing a one-to-one mapping of the M distinct colors onto the pixels in the M disjoint clusters; and (b) a soft decision module for applying a soft decision optimization process to the first new index sequence and the first new output function to provide the new index sequence and the new output function respectively based on, for each member of the first new index sequence, how a color value assigned to that member by the first new output function correlates with the color value assigned to at least one other member of the first new index sequence by the first new output function, and wherein the soft decision module is operable (i) to apply an iterative soft decision optimization process, (ii) to determine, after each iteration, an incremental reduction in a cost function representing compression and distortion of the original digitized color image, and (iii) to terminate the iterative soft decision optimization process and determine the new index sequence and the new color mapping when the incremental reduction falls below a selected threshold.

11. The data processing system as defined in claim 10 wherein the iterative soft decision optimization process comprises (i) setting a counter k equal to one; (ii) for a $k^{th}$ index sequence, determining a $(k+1)^{th}$ index sequence by optimizing the cost function, for a $k^{th}$ output function and a $k^{th}$ transition probability function, over all possible index sequences; (iii) determining a $(k+1)^{th}$, output function and a $(k+1)^{th}$ transition probability function from the $(k+1)^{th}$ index sequence; (iv) determining a $(k+1)^{th}$ cost from the $(k+1)^{th}$ index sequence, the $(k+1)^{th}$ output function and the $(k+1)^{th}$ transition probability function; and, (v) calculating a $(k+1)^{th}$ cost difference between the $(k+1)^{th}$ cost and a k.sup.th cost, and, when the $(k+1)^{th}$ cost difference is less than a selected threshold, selecting the $(k+1)^{th}$ index sequence and the $(k+1)^{th}$ output function as the new index sequence and the new output function respectively, otherwise, increasing k by 1 and repeating sub-steps (ii) to (v).

12. The data processing system as defined in claim 11 wherein, in step (ii), the step of determining the $(k+1)^{th}$ index sequence by optimizing the cost function, for the given k.sup.th output function and $k^{th}$ transition probability function, over all possible index sequences comprises using a Viterbi algorithm.

13. The data processing system as defined in claim 12 wherein the first decision module is operable to group the M disjoint clusters into M' disjoint groups, M' being less than M; and, the first decision module is operable to apply the soft decision optimization process relative to the M' disjoint groups.

14. The data processing system as defined in claim 13 wherein the cost function depends on both M and M'.

15. A computer program product for use on a computer system to create pixel mapping and a new output function representing a color palette for a new digitized color image derived from an original digitized color image both defined on n pixels, wherein the original digitized color image is provided by N distinct colors being allocated to the n pixels, the new digitized color image is provided by M distinct colors being allocated to the n pixels, the new index sequence has n index members for representing the n pixels and the new output function is for mapping the n index members to the M colors, the computer program product comprising:
 a recording medium;
 means recorded on the medium for instructing the computer system to perform the steps of:
 (a) providing a first new index sequence by partitioning all pixels in the original digitized color image into M disjoint clusters based on a color of each pixel in the original digitized color image, wherein M is less than or equal to N;
 (b) providing a first new output function for providing a one-to-one mapping of the M distinct colors onto the pixels in the M disjoint clusters; and,
 (c) applying a soft decision optimization process to the first new index sequence and the first new output function to provide the new index sequence and the new output function respectively based on, for each member of the first new index sequence, how a color value assigned to that member by the first new output function correlates with the color value assigned to at least one other member of the first new index sequence by the first new output function.

16. The computer program product as defined in claim 15 wherein the new index sequence provides a soft decision pixel mapping such that, for each pixel in the new digitized color image, the color value assigned to the pixel by the new index sequence and the new output function depends on the location of the pixel in the color image.

17. A computer program product for use on a computer system to create pixel mapping and a new output function representing a color palette for a new digitized color image derived from an original digitized color image both defined on n pixels, wherein the original digitized color image is provided by N distinct colors being allocated to the n pixels, the new digitized color image is provided by M distinct colors being allocated to the n pixels, the new index sequence has n index members for representing the n pixels and the new output function is for mapping the n index members to the M colors, the computer program product comprising:
 a recording medium;
 means recorded on the medium for instructing the computer system to perform the steps of:
 (a) providing a first new index sequence by partitioning all pixels in the original digitized color image into M disjoint clusters based on a color of each pixel in the original digitized color image, wherein M is less than or equal to N;
 (b) providing a first new output function for providing a one-to-one mapping of the M distinct colors onto the pixels in the M disjoint clusters;
 (c) applying a soft decision optimization process to the first new index sequence and the first new output function to provide the new index sequence and the new output function respectively based on, for each member of the first new index sequence, how a color value assigned to that member by the first new output function correlates with the color value assigned to at least one other member of the first new index sequence by the first new output function;
 wherein step (c) comprises applying an iterative soft decision optimization process and determining, after each iteration, an incremental reduction in a cost function representing compression and distortion of the original digitized color image; and
 step (c) terminates and the new index sequence and the new color mapping determined when the incremental reduction falls below a selected threshold.

18. The computer program product as defined in claim 17 wherein step (c) comprises
 (i) setting a counter k equal to one;
 (ii) for a $k^{th}$ index sequence, determining a $(k+1)^{th}$ index sequence by optimizing the cost function, for a $k^{th}$ output function and a $k^{th}$ transition probability function, over all possible index sequences;
 (iii) determining a $(k-1)^{th}$ output function and a $(k+1)^{th}$ transition probability function from the $(k+1)^{th}$ index sequence;
 (iv) determining a $(k+1)^{th}$ cost from the $(k+1)^{th}$ index sequence, the $(k+1)^{th}$
 (v) calculating a $(k+1)^{th}$ cost difference between the $(k+1)^{th}$ cost and a $k^{th}$ cost, and, when the $(k+1)^{th}$ cost difference is less than a selected threshold, selecting the $(k+1)^{th}$ index sequence and the $(k+1)^{th}$ output function as the new index sequence and the new output function respectively, otherwise, increasing k by 1 and repeating substeps (ii) to (v).

19. The computer program product as defined in claim 18 wherein in step (ii), the step of determining the $(k+1)^{th}$ index sequence by optimizing the cost function, for the given $k^{th}$ output function and $k^{th}$ transition probability function, over all possible index sequences comprises using a Viterbi algorithm.

20. The computer program product as defined in claim 19 wherein
 step (a) further comprises grouping the M disjoint clusters into M' disjoint groups, M' being less than M; and,
 step (c) comprises applying the soft decision optimization process relative to the M' disjoint groups.

21. The computer program product as defined in claim 20 wherein the cost function depends on both M and M'.

* * * * *

UNITED STATES PATENT AND TRADEMARK OFFICE
CERTIFICATE OF CORRECTION

PATENT NO. : 8,253,757 B2
APPLICATION NO. : 13/194376
DATED : August 28, 2012
INVENTOR(S) : En-hui Yang It is certified that error appears in the above-identified patent and that said Letters Patent is hereby corrected as shown below:

First Page, Column 2 (Other Publications), Line 1, Delete "Quanitzation" and insert -- Quantization --, therefor.

First Page, Column 2 (Other Publications), Line 7, Delete "Ssytems" and insert -- Systems --, therefor.

Column 21, Line 32, In Claim 4, delete "$(k+1)_r$," and insert -- $(k+1)_{th}$ --, therefor.

Column 21, Line 36, In Claim 4, after "a selected" insert -- threshold, selecting the $(k+1)^{th}$ index sequence and the $(k+1)^{th}$ output function as --, therefor.

Column 22, Line 57, In Claim 11, delete "$(k+1)^{th}$," and insert -- $(k+1)^{th}$ --, therefor.

Column 24, Line 36, In Claim 18, delete "$(k-1)^{th}$" and insert -- $(k+1)^{th}$ --, therefor.

Column 24, Line 40, In Claim 18, after "the $(k+1)^{th}$" insert -- output function and the $(k+1)^{th}$ transition probability function; and, --, therefor.

Signed and Sealed this
Twenty-sixth Day of February, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,253,757 B2
APPLICATION NO. : 13/194376
DATED : August 28, 2012
INVENTOR(S) : En-hui Yang Page 1 of 1

It is certified that error appears in the above-identified patent and that said Letters Patent is hereby corrected as shown below:

In the Claims:

Column 21, Line 26, In Claim 4, delete "k.sup.th" and insert -- $k^{th}$ --, therefor.

Column 22, Line 62, In Claim 11, delete "k.sup.th" and insert -- $k^{th}$ --, therefor.

Column 23, Line 4, In Claim 12, delete "k.sup.th" and insert -- $k^{th}$ --, therefor.

Signed and Sealed this
Twenty-third Day of April, 2013

Teresa Stanek Rea
*Acting Director of the United States Patent and Trademark Office*